Nov. 20, 1934.                F. HILLE                1,981,174
                            TOOL GRINDER
                    Filed March 27, 1933        2 Sheets-Sheet 1

Inventor.
Frederick Hille.

Nov. 20, 1934.  F. HILLE  1,981,174
TOOL GRINDER
Filed March 27, 1933  2 Sheets-Sheet 2
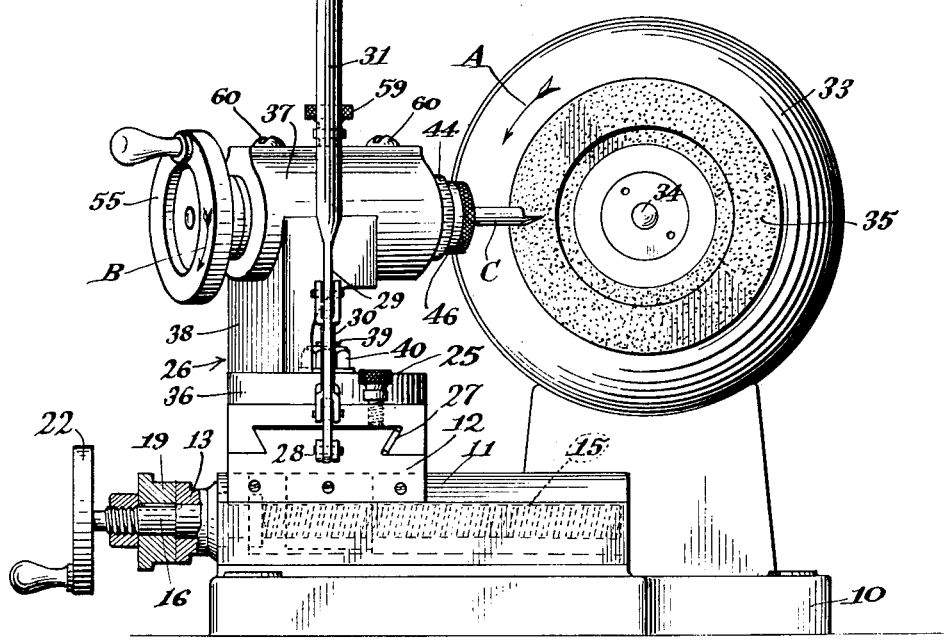
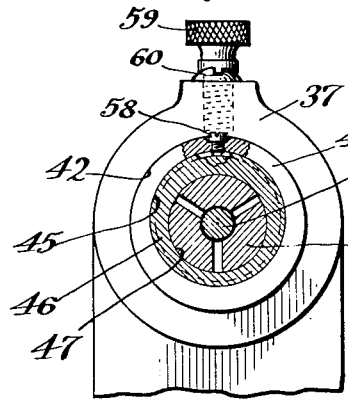
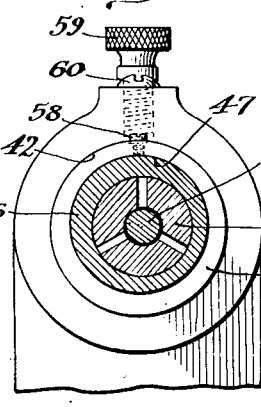
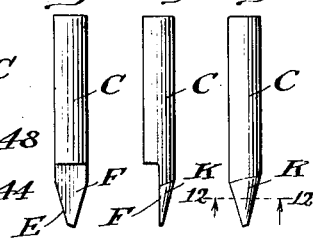
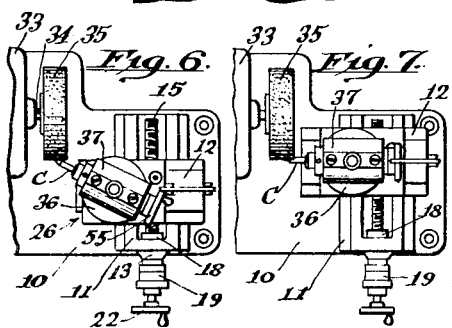
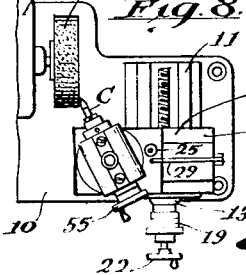
Inventor
Frederick Hille.
Attorney.

Patented Nov. 20, 1934

1,981,174

UNITED STATES PATENT OFFICE 1,981,174

TOOL GRINDER

Frederick Hille, Los Angeles, Calif.

Application March 27, 1933, Serial No. 662,912

4 Claims. (Cl. 51—105)

This invention relates generally to tool grinders, more particularly to a grinder for cutters employed in routing, die cutting and engraving machines.

In forming tools of the character stated, it is necessary that they be accurately ground, also several tools exactly the same size should be provided so that if one should become dull or broken it may be replaced with another that will correspond to the groove or cut being made in the plate or die in order that the work may be continued without marring or spoiling the same.

Heretofore this grinding operation has been either done manually or with suitable tool rests in connection with a grinding wheel.

Although it is possible to grind a cutter in this manner, there is no way of determining whether it has been accurately ground until tested in the routing machine.

Such procedure not only requires considerable time and trouble but often results in a faulty plate or ruins work already done.

It is therefore an object of the present invention to provide a cutter grinder so constructed that a cutter may be accurately ground to a predetermined size.

Another object is to provide a cutter grinder in which the clip clearance on a cutter may be formed without danger of spoiling the cutting edge.

Other objects and advantages will be apparent from the following description, reference being had to the accompanying drawings, in which:

Fig. 3 is a front elevation.

Fig. 4 is a detail section taken through the tool head as indicated by line 4—4 of Fig. 2.

Fig. 5 is a view analogous to Fig. 4 but showing the cutter shank as it appears when in offset relation to the axis of the tool head.

Fig. 6 is a fragmentary top plan view (on a reduced scale) showing the relative position of the tool head to the grinding wheel during forming the bevel end on the cutter.

Fig. 7 is a view analogous to Fig. 6 but showing the position of the parts while forming the flat or relief on the cutter shank.

Fig. 8 is a view showing the cutter shank with the bevel edge engaging the face of the wheel prior to the forming of the chip clearance therein.

Fig. 9 is a face view of the cutter formed by the improved grinder.

Fig. 10 is a side elevation of the cutter.

Fig. 11 is a rear elevation of the cutter.

Fig. 12 is an enlarged section taken on line 12—12 of Fig. 11 in the direction indicated by the arrows.

Figure 1:
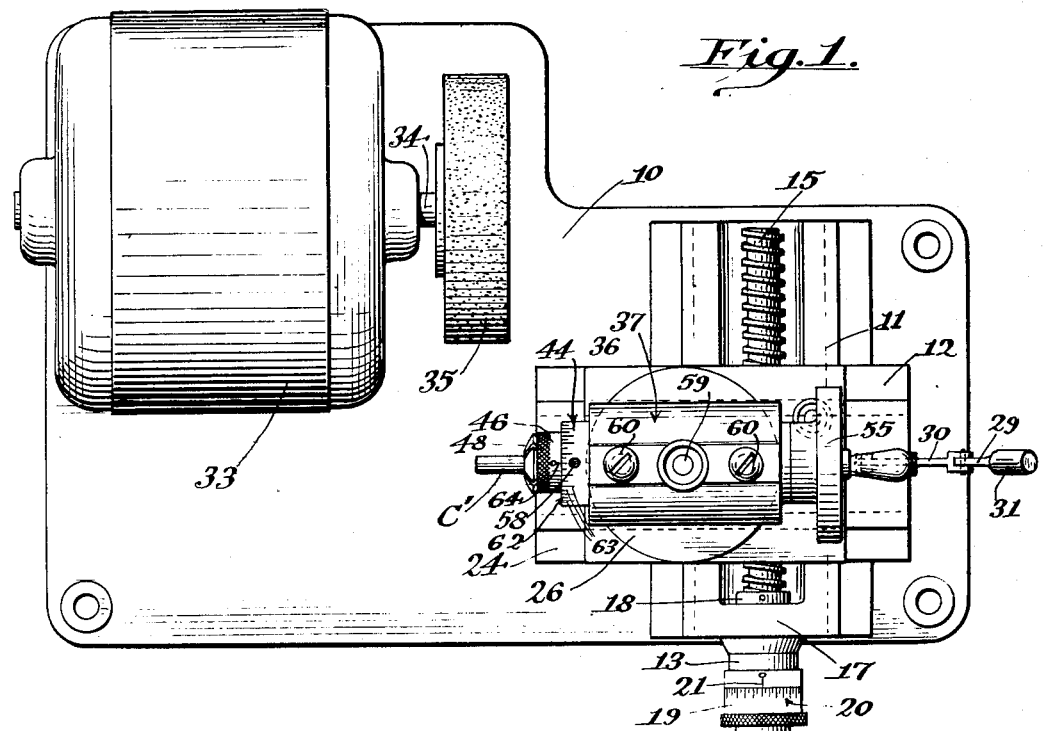
Fig. 1 is a top plan view of the improved cutter grinder.

Referring more specifically to the drawings, 10 designates a base upon which is mounted a bed plate 11 that slidably supports a carriage 12.

Secured to carriage 12 is a nut 14 which engages a screw 15 that serves to shift the same on the bed plate, the screw being provided with a stem 16 which extends through aligned openings formed in the end wall 17 of the bed plate and an annulus 13 secured thereto.

Secured to the stem of screw 15 are collars 18 and 19 that engage the face of the annulus and wall 17 of the bed plate respectively and serve to hold said screw against shifting movement.

Formed on collar 19 is a graduated dial, the indices 20 of which are adapted to register with a single mark 21 formed on the annulus. The threads of screw 15 are left hand and of such pitch that one revolution of it will move the carriage a distance corresponding to one-half the diameter of the shank of the cutter blank for a purpose hereinafter described.

Secured to the outer end of the screw shank 16 is a hand wheel or crank 22 for turning the same.

Mounted on the carriage and slidable in a plane disposed at right angles to its direction of travel is a block 24 upon which is mounted a turret or tool head generally designated at 26.

Screw threaded in block 24 is a set screw 25 that is provided to hold the block and turret against movement when required.

The carriage block and bed plate are held in assembled relation by usual dove-tail joints indicated at 27.

Pivotally connected to a bracket 28 secured to the carriage is lever 29 which in turn is connected by a link 30 to block 24, the lever having a handle 31 whereby the block and turret thereon may be manually shifted on the carriage.

Mounted on a suitable stand formed on base 10 is an electric motor 33, the armature shaft 34 of which is disposed at right angles to the axis of screw 15, and removably secured to said shaft is a usual cup grinding wheel 35.

Turret 26 consists of an annular base 36 and a head 37 carried by a standard 38 formed integral therewith, the base having a concentric opening therein that engages a stud 39 screw threaded or otherwise secured to block 24.

Threaded on stud 39 and engaging the base is a nut 40 that is provided to clamp or hold the turret in adjusted position.

Formed in head 37 is a horizontally disposed bore 42 in which is rotatably mounted a sleeve 44, the bore 45 of which is formed on a radius eccentric to that of bore 42. It will be noted that the axis of bore 42 lies in the same horizontal plane as that of the shaft 34 of motor 35.

Rotatably mounted in bore 45 of sleeve 44 is a cylinder 46, the bore 47 of which is formed on a radius eccentric to its axis, in which is mounted a collet 48 for reception and positioning of the cutter shank —C—.

The collet 48 has a flared end 49 that engages a corresponding face formed on the end of bore 47 of member 46, is internally threaded as indicated at 50 for engagement with a tightening screw 52 and is held against turning movement within said member by a suitable key or pin 53 secured thereto that engages a seat 54 formed in the face of the collet shank.

Formed on or secured to screw 52 is a crank or hand wheel 55 provided with a hub 56 that extends into the bore of cylinder 46.

Threaded in sleeve 44 and engaging a groove 57 formed in cylinder 46 is a set screw 58 that serves to hold the same against rotation, while a thumb screw 59 threaded in head 37 is provided to temporarily hold the sleeve against rotation. The sleeve is held against shifting within bore 42 by a pair of screws or the like 60 threaded in the head with their ends projecting into grooves formed in said sleeve.

Sleeve 44, cylinder 46 and the collet, together with the cutter (or blank from which the cutter is formed), rotate in unison upon turning of the hand wheel 55, the sleeve and cylinder being provided in order that the cutter may be either rotated on a fixed or an off-center or eccentric axis.

The axis of the sleeve remains constant during rotation while the axis of the cylinder and collet with the cutter thereon may be varied, i. e. when the axis of cylinder and sleeve coincide as shown in Fig. 4 the cutter turns on its own axis, while if the cylinder is turned within the sleeve, for example as shown in Fig. 5, it will cause the axis of the cutter to be eccentric to or traverse a path about the axis of said sleeve.

Formed on sleeve 44 is a scale 62, the indices 63 of which register with a mark 64 formed on the cylinder, and serve to indicate the relative positions of the axis of the bores of said sleeve and cylinder, the axis of the sleeve and cylinder coinciding when the zero indice of the scale registers with the mark on the cylinder.

A scale 65 formed on the periphery of the turret base 36 is provided in order to indicate the position of the axis of the tool head 37 in relation to the grinding wheel 35.

Figure 2:
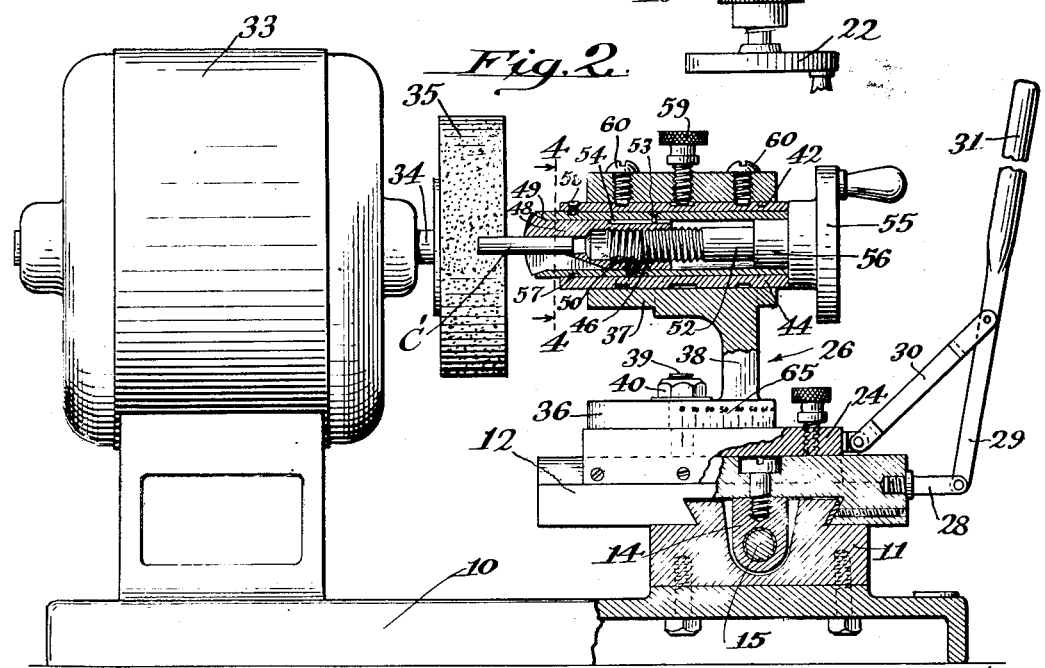
Fig. 2 is a side elevation, parts being broken away and shown in section.

*Operation.*—A cutter blank indicated at C' is positioned in the tool head with the sleeve and cylinder set so that the cutter will turn on its own axis as above described. The turret is now turned to a position so that the axis of the tool head will be disposed in angular relation to the axis of the grinding wheel, the desired degree of angularity being determined by reference to the indices of scale 65 in relation to a single mark on base 24, as shown in Fig. 2.

Screw 15 is then turned (by hand wheel 22) and lever 29 rocked to bring the cutter blank into such position that it will engage the periphery of the grinding wheel, which wheel rotates in the direction indicated by the arrow —A— in Fig. 3.

Hand wheel 55 is now turned to impart rotation, while wheel 22 is turned to move the cutter blank into engagement with the grinding wheel, the action of which forms a beveled or conical end on the blank as shown in Fig. 6, and is the first step in the operation of forming the cutter.

The tool head is now turned to a position so that its axis will be in parallel relation to that of the grinding wheel, and the carriage 12 moved (by turning crank 22) until the side of the cutter blank engages the grinding wheel. The indice of scale 20 that may be in register with mark 21 is noted and screw 15 given one turn through hand wheel 22, the action of which results in moving the cutter a distance one-half its diameter (due to the pitch of the threads of screw 15) and forms the flat or relief —F— and cutting edge —E— (see Figs. 9 and 10) and is the second step in forming the cutter.

The above operations are preferably done on the peripheral face of the grinding wheel for the reason that it forms a hollow ground —G— in the relief which is desirable, also that the face of the wheel may be easily trued up when it becomes worn.

The third or final step i. e. forming the chip clearance back of the cutting edge is the most difficult and requires the greatest degree of accuracy in grinding tools of this character.

Heretofore, this operation has been manually done by the sight or "fit and try" method and if not carefully done usually results in an irregular or offset cutting edge.

With the improved grinder the chip clearance is formed by adjustment of the cylinder 46 within sleeve 44 as follows.

Thumb screw 59 is tightened to temporarily hold sleeve 44 against rotation, and screw 58 loosened to permit turning of the cylinder therein. The cylinder is then turned to the right (i. e. when facing the tool head), the action of which throws its axis and that of the collet off center as shown in Fig. 5, the degree of eccentricity being determined by reference to scale 62. Set screw 58 is again tightened and a cutter blank with a taper and relief formed thereon as above described is positioned in the collet with the flat disposed in a horizontal plane.

The tool head is now turned to a position so that the cutting edge thus formed on the cutter blank will lie in a plane parallel with the face of the grinding wheel.

Lever 29 and wheel 22 are then manipulated to bring the cutting edge into engagement with the face of the grinding wheel as shown in Fig. 8, whereupon screw 25 is tightened to prevent movement of the tool head.

Hand wheel 55 is now turned in the direction indicated by the arrow B in Fig. 3, the movement of which, due to eccentric position of the cutter axis in relation to the tool head bore forms the chip clearance designated at —K— in Fig. 12. The tip of the cutter thus formed is adapted to flatten on angle in the usual manner.

Although it is desirable to form the chip clearance as above described for the reason that the cutting edge may be seen, it may however be done on the side of the wheel.

In this instance, the tool head is returned to the position shown in Fig. 6 after forming the flat, the cylinder turned in the sleeve but to the left and the hand wheel given one turn.

It will be readily understood that the cutter grinder above described may be employed to regrind or true up cutters already formed.

I claim:

1. A cutter grinder comprising a base, a cup grinding wheel rotatably mounted on said base with its axis disposed in a horizontal plane, a swiveled tool head slidably mounted on the base, a pair of cylindrical members having eccentric bores formed therethrough rotatably mounted in said tool head in relation to each other, means mounted in the inner member and rotatable therewith for positioning a cutter blank therein, and means for retaining said members in adjusted position whereby the cutter blank may be turned on a concentric or eccentric axis in relation to the tool head.

2. A cutter grinder comprising a base, a cup grinding wheel rotatably mounted on said base with its axis disposed in a horizontal plane, a swiveled tool head slidably mounted on the base, a pair of cylindrical members having eccentric bores formed therethrough rotatably mounted in said tool head in relation to each other, means mounted in the inner member and rotatable therewith for positioning a cutter blank therein, means for retaining said members in adjusted position whereby the cutter blank may be turned on a concentric or eccentric axis in relation to the tool head, and means for shifting said tool head on the base.

3. A cutter grinder comprising a base, a cup grinding wheel rotatably mounted on said base with its axis disposed in a horizontal plane, a carriage slidably mounted on said base with its direction of travel disposed at right angles to the axis of said cutter, a block slidably mounted on said carriage at right angles thereto, a turret mounted on said block including a tool head having a horizontally disposed bore formed therein on an axis lying in substantially the same plane as that of said grinding wheel, a sleeve having an eccentric bore formed therethrough rotatably mounted in the bore in said tool head, a cylindrical member having an eccentric bore therein rotatably mounted in said sleeve, means mounted in the cylindrical member and rotatable therewith for positioning a cutter blank therein, means for retaining said sleeve and cylindrical member in adjusted position in relation to each other whereby the cutter blank may be turned on a concentric or eccentric axis in relation to the axis of the tool head, and means for shifting said tool head on the base.

4. In a cutter grinder, a tool head having a bore therein, a sleeve having its bore formed on an axis eccentric to the bore of said tool head and rotatably mounted therein, a cylindrical member having an eccentric bore therein and rotatably mounted in the bore of said sleeve, the degree of eccentricity of the bores of said sleeve and cylindrical member being of such relation to each other that the axis of the latter may be brought into or out of register with the axis of the bore in said tool head, a collet adapted to receive a cutter blank slidably mounted in the cylindrical member and rotatable therewith, a screw threadedly engaging said collet for tightening a cutter blank when positioned therein, and a screw threaded in said sleeve and engaging the cylindrical member for retaining the same in the sleeve whereby the cutter blank may be turned on a concentric or eccentric axis in relation to the tool head.

FREDERICK HILLE.